UNITED STATES PATENT OFFICE.

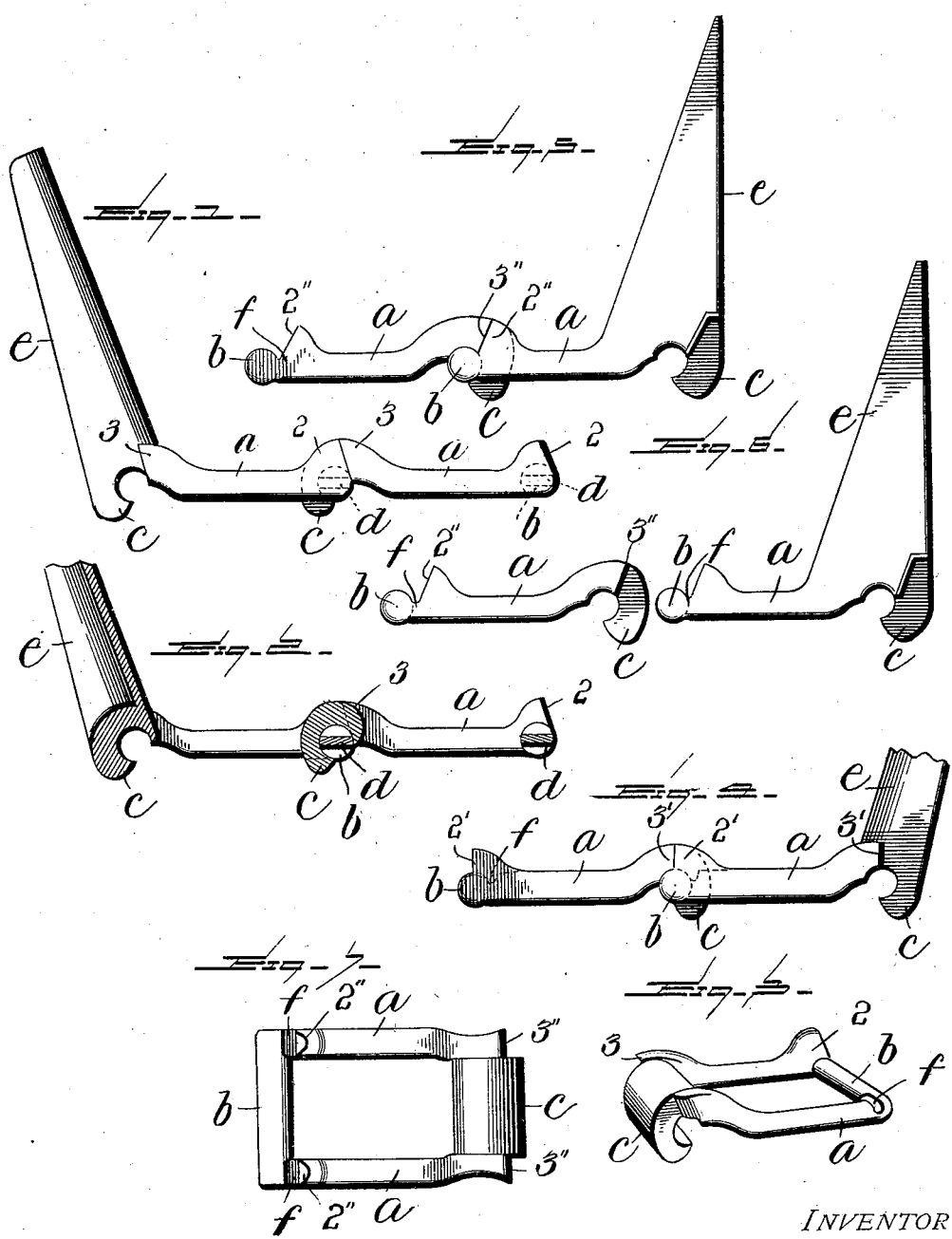

CHRISTOPHER W. LEVALLEY, OF MILWAUKEE, WISCONSIN.

CHAIN.

SPECIFICATION forming part of Letters Patent No. 713,120, dated November 11, 1902.

Application filed November 26, 1901. Serial No. 83,792. (No model.)

*To all whom it may concern:*

Be it known that I, CHRISTOPHER W. LEVALLEY, a citizen of the United States, residing at Milwaukee, in the county of Milwaukee and State of Wisconsin, have invented new and useful Improvements in Chains, of which the following is a specification.

My invention relates to chain belting used for the purpose of transmitting power in various forms of conveying mechanism and for kindred purposes; and it has for its object to produce a chain or chain belt of this character which shall be rigid in one direction substantially transverse to the axes of articulation of the separate links, so that when the belt is running in a horizontal direction it will not sag, but will be maintained rigid and substantially in a plane.

In order that my invention may be the better understood, I have illustrated several embodiments thereof in the accompanying drawings, which several forms of my invention differ from each other in minor particulars in order to illustrate the fact that the invention is not limited to details of construction and arrangement.

In the drawings, Figure 1 is a side view of a small section of chain or chain belting embodying one form of my invention. Fig. 2 is a vertical longitudinal section of the same. Fig. 3 is a perspective view of a single link, showing a different form of the invention from that illustrated in Figs. 1 and 2. Fig. 4 is a side view of a short section of chain embodying my invention in a different form from that illustrated in Fig. 1. Fig. 5 is a view similar to Figs. 1 and 4, but showing still another form of the invention. Fig. 6 is a side view of two of the links of the form shown in Fig. 5 disconnected from each other. Fig. 7 is a top plan view of one of the links represented in Figs. 5 and 6.

I have illustrated my invention in connection with a sprocket-chain formed of separate detachable articulating links of the solid-link type—that is to say, of links each formed of opposite side bars *a a*, an end bar *b*, and a coupling-hook *c*, adapted to engage with the end bar *b* of an adjacent link. The links are provided at their opposite ends with abutting shoulders or stop-lugs. These shoulders or lugs are preferably carried by and formed integral with the side bars *a*, and the lug or projection at the end of the link having the end bar *b* is designated 2, while that at the opposite end of the link, the end provided with the hook *c*, is designated 3. The shoulders or lugs are so disposed that their end faces will come into engagement or abut in position above the axis of articulation when the links are in a horizontal position, as represented in Figs. 1, 4, and 5. I prefer that the abutting faces of the shoulders or lugs 2 and 3 should be approximately at right angles to the horizontal plane of the chain when stretched out, so as to bring these faces into engagement. This arrangement forms a stop-joint on the principle of what is known as the "rule" or "prop" joint and serves to hold the links rigidly in horizontal position and prevents them from sagging, though permitting them to articulate as required in passing over the sprocket or other wheels with which they engage.

This invention is particularly adapted for use in chain or chain belting used for the conveying of light material, and I have represented certain of the links as being provided with projections *e*, to be used for conveying purposes.

I have heretofore intimated that my invention may be varied in details of construction and arrangement. In Fig. 1 I have represented the links as being provided with two of the stop-joints at each articulation—that is to say, there is a pair of the abutting projections 2 and 3 on each side of the chain in line with each side bar. The projections 2 and 3 are so disposed as to bring the abutting faces thereof in rear of the hook *c* and of the end bar *b*, which engages therewith. The method of coupling and uncoupling the links is that illustrated in my Patent No. 181,082, of August 15, 1876, in which the end bar is centrally notched or reduced in size, as represented at *d*, and the hook is tapered or beveled, so as to permit the reduced portion of the end bar to pass through the narrow throat formed between the end of the hook and its base.

The abutting faces of the shoulders or projections 2 and 3 are not absolutely at right angles to a horizontal plane which would include the several links when stretched out in working position, but they rather incline forward toward the hook ends of the link slightly—that is, the upper ends of the abutting faces of the stop-joints are slightly in advance of the lower ends. For some purposes I prefer to thus slightly incline these abutting faces. This, however, does not change the principle of the invention, as the abutting faces are still approximately at right angles to the horizontal plane including the links when stretched out in working position, and thus the features of a rule stop-joint are maintained.

The link represented in Fig. 3 is intended to be coupled and uncoupled by a sidewise movement instead of a direct endwise or thrust movement. One of the side bars in this link is represented as being notched, as at $f$, so that it can be caused to enter the hook $c$ from the side. In this form of the invention the stop-joint can be formed on one side of the chain only—the side which is opposite to that having the bar notched, as at $f$.

In the form of my invention shown in Fig. 4 the coupling means are similar to those represented in Fig. 3, but the lugs 2' and 3' are so disposed as to bring their abutting faces directly above the center of the end bar $b$ when they come into engagement, and the abutting faces are formed at right angles to the side bars $a$.

In the form of chain represented in Figs. 5 and 6 the projections 2'' and 3'' are arranged in advance of the side bars $b$. The lugs or projections 2'' rise from the side bars $a$ just in advance of the notches $f$, and the projections 3'' are correspondingly carried forward, so that engagement will be effected when the links are brought into horizontal position. When the invention is of the form illustrated in these views, the chain may have the stop-joints on both sides of the hook and each side bar may be notched, as at $f$, to permit coupling and uncoupling by a sidewise movement from either side. The form of projection $e'$ shown in Figs. 5 and 6 is somewhat different from that shown in the other views.

Having described my invention, what I claim, and desire to secure by Letters Patent, is—

1. A chain comprising separate articulating links each having side bars, an end bar and a coupling-hook formed integrally, the side bars of the links having projections adapted to form stop-joints at the articulations of the chain, such projections being arranged at the ends of the side bars and opposite the ends of the end bar, substantially as set forth.

2. A drive-chain comprising links each having two side bars an end bar and a coupling-hook cast integrally, one of the side bars being notched adjacent to the end bar to permit engagement with a coupling-hook, and the opposite side bar being provided with shoulders 2 and 3 arranged to form stop-joints, the shoulder 2 being at the end of a side bar and opposite the end bar, substantially as set forth.

CHRISTOPHER W. LEVALLEY.

Witnesses:
VLASTA I. KLOFANDA,
JOSEPH LOCH.